United States Patent
Nakajima et al.

(10) Patent No.: US 10,875,501 B2
(45) Date of Patent: Dec. 29, 2020

(54) IN-VEHICLE DEVICE, RECORDING MEDIUM, AND KEYLESS ENTRY SYSTEM

(71) Applicant: ALPS ALPINE CO., LTD., Tokyo (JP)

(72) Inventors: Satoshi Nakajima, Miyagi (JP); Satoshi Hayasaka, Miyagi (JP); Akira Hashimoto, Detroit, MI (US); Itaru Yamana, Miyagi (JP); Yasuhiro Suzuki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/460,097

(22) Filed: Jul. 2, 2019

(65) Prior Publication Data

US 2020/0017074 A1    Jan. 16, 2020

Related U.S. Application Data

(60) Provisional application No. 62/696,138, filed on Jul. 10, 2018.

(51) Int. Cl.
     *B60R 25/24*        (2013.01)
     *B60R 25/01*        (2013.01)
                 (Continued)

(52) U.S. Cl.
     CPC ............ *B60R 25/245* (2013.01); *B60R 25/01* (2013.01); *B60R 25/10* (2013.01); *B60R 25/34* (2013.01);
                 (Continued)

(58) Field of Classification Search
     CPC ...... B60R 25/245; G08C 17/02; H04B 1/3822
     See application file for complete search history.

(56) References Cited

U.S. PATENT DOCUMENTS

| 8,155,827 | B2 | 4/2012 | Nakajima et al. |
| 9,646,443 | B2 * | 5/2017 | Hamada ............. G07C 9/00309 |

(Continued)

FOREIGN PATENT DOCUMENTS

| JP | 2002-188342 | 7/2002 |
| JP | 2007-205004 | 8/2007 |

(Continued)

OTHER PUBLICATIONS

Japanese Office Action for 2019-121779 dated Aug. 4, 2020.

*Primary Examiner* — Daniell L Negron
(74) *Attorney, Agent, or Firm* — IPUSA, PLLC

(57) ABSTRACT

An in-vehicle device includes a plurality of transmitting antennas, an in-vehicle device transmitter configured to transmit measurement signals via the plurality of respective transmitting antennas, an in-vehicle device receiver configured to receive, from a portable device, a measurement result signal that includes measurement data of received signal strengths of the respective measurement signals that have been transmitted from the plurality of respective transmitting antennas, and an in-vehicle device controller configured to determine whether to identify a location of the portable device based on the received signal strengths included in the measurement result signal, and, in a case where the in-vehicle device controller has determined that the location of the portable device is to be identified, identify the location of the portable device based on the received signal strengths included in the measurement result signal.

24 Claims, 10 Drawing Sheets

(51) Int. Cl.
*B60R 25/10* (2013.01)
*B60R 25/34* (2013.01)
*H04B 1/00* (2006.01)
*H04B 1/3822* (2015.01)
*G08C 17/02* (2006.01)

(52) U.S. Cl.
CPC ............. *G08C 17/02* (2013.01); *H04B 1/005* (2013.01); *H04B 1/3822* (2013.01); *G08C 2201/60* (2013.01); *G08C 2201/91* (2013.01)

(56) References Cited

U.S. PATENT DOCUMENTS

| | | |
|---|---|---|
| 2017/0190317 A1 | 7/2017 | Hamada et al. |
| 2017/0203721 A1* | 7/2017 | Hamada .................... G01S 1/08 |

FOREIGN PATENT DOCUMENTS

| | | |
|---|---|---|
| JP | 2010-203066 | 9/2010 |
| JP | 2016-020580 | 2/2016 |
| JP | 2016-080505 | 5/2016 |

* cited by examiner

IN-VEHICLE DEVICE, RECORDING MEDIUM, AND KEYLESS ENTRY SYSTEM

CROSS-REFERENCE TO RELATED APPLICATIONS

This application claims the benefit of U.S. provisional application No. 62/696,138, filed on Jul. 10, 2018, the entire contents of which are incorporated herein by reference.

BACKGROUND OF THE INVENTION

1. Field of the Invention

The disclosures herein relate to an in-vehicle device, a recording medium, and a keyless entry system.

2. Description of the Related Art

Conventionally, keyless entry systems that include in-vehicle devices installed in vehicles and portable devices carried by users have been utilized. In the keyless entry systems, in order to control turning on or off of lamps and locking and unlocking of a vehicle, it is important to identify the location of a portable device (a user) with respect to the vehicle. Conventionally, a method for identifying the location of a portable device with respect to a vehicle has been proposed. In the conventional method, an in-vehicle device transmits measurement signals from a plurality of respective transmitting antennas, the portable device measures received signal strength indicator (RSSI) of each of the measurement signals, and transmits a measurement result signal that includes measurement data of the received signal strengths, and the in-vehicle device identifies the location of the portable device based on the received signal strengths included in the measurement result signal.

However, in the above-described conventional method, the in-vehicle device identifies the location of the portable device based on the received signal strengths included in the measurement result signal that has been received from the portable device, even in a case where the portable device fails to measure some received signal strengths or even in a case where some received signal strengths measured by the portable device are weak because the portable device is located away from the in-vehicle device. As a result, the accuracy of identifying the location of the portable device may be reduced.

RELATED-ART DOCUMENTS

Patent Documents

Patent Document 1: Japanese Laid-Open Patent Publication No. 2007-205004
PATENT DOCUMENT 2: Japanese Laid-Open Patent Publication No. 2002-188342
PATENT DOCUMENT 3: Japanese Laid-Open Patent Publication No. 2010-203066

SUMMARY OF THE INVENTION

It is a general object of the present invention to provide a keyless entry system that accurately identifies the location of a portable device based on signal strengths of received measurement signals.

According to at least one embodiment, an in-vehicle device includes a plurality of transmitting antennas, an in-vehicle device transmitter configured to transmit measurement signals via the plurality of respective transmitting antennas, an in-vehicle device receiver configured to receive, from a portable device, a measurement result signal that includes measurement data of received signal strengths of the respective measurement signals that have been transmitted from the plurality of respective transmitting antennas, and an in-vehicle device controller configured to determine whether to identify a location of the portable device based on the received signal strengths included in the measurement result signal, and, in a case where the in-vehicle device controller has determined that the location of the portable device is to be identified, identify the location of the portable device based on the received signal strengths included in the measurement result signal.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings. In the specification and drawings, elements having substantially the same functions or configurations are referred to by the same numerals, and a duplicate description thereof will be omitted.

Figure 1:
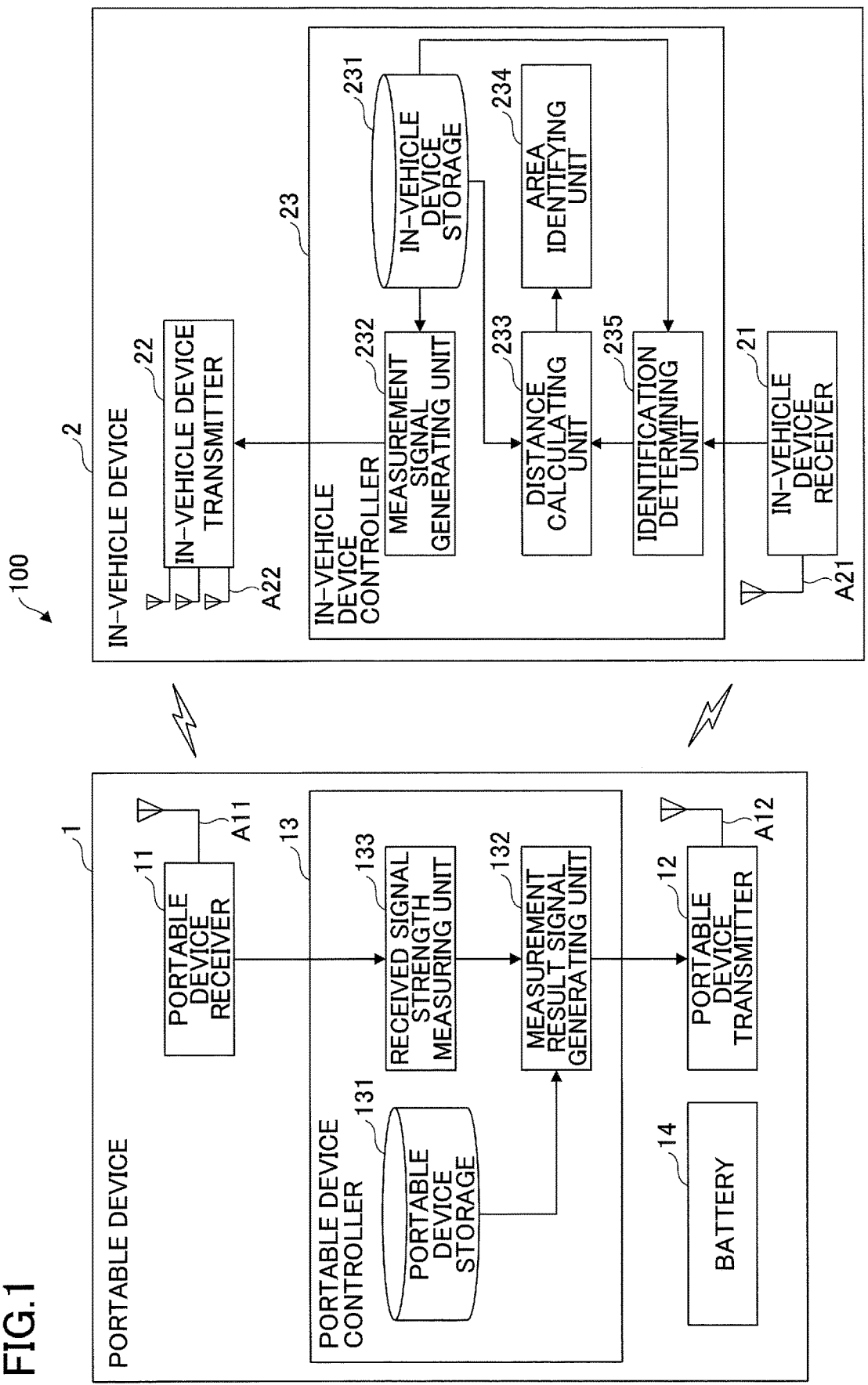
FIG. 1 is a diagram illustrating an example of a configuration of a keyless entry system.

A keyless entry system 100 according to one embodiment will be described with reference to FIG. 1 to FIG. 10. First, a configuration of the keyless entry system 100 will be described. FIG. 1 is a diagram illustrating an example of the configuration of the keyless entry system 100. The keyless entry system 100 of FIG. 1 includes a portable device 1 and an in-vehicle device 2.

First, a hardware configuration of the portable device 1 will be described. The portable device 1 is a wireless terminal that wirelessly communicates with the in-vehicle device 2, and is carried by a user (a driver, for example) of the keyless entry system 100. The portable device 1 may be a dedicated terminal or a portable terminal such as a smartphone or a tablet terminal. The portable device 1 illustrated in FIG. 1 includes a receiving antenna A11, a portable device receiver 11, a transmitting antenna A12, a portable device transmitter 12, a portable device controller 13, and a battery 14.

The receiving antenna A11 is an antenna connected to the portable device receiver 11. The receiving antenna A11 receives a wireless signal transmitted from the in-vehicle device 2, converts the received wireless signal into an electrical signal, and inputs the electrical signal into the portable device receiver 11. The receiving antenna A11 may be a three-axis antenna having three antennas arranged perpendicular to each other, but is not limited thereto.

The portable device receiver 11 is a receiving circuit that receives a wireless signal transmitted from the in-vehicle device 2 via the receiving antenna A11, and is connected to the portable device controller 13. The wireless signal received by the portable device receiver 11 includes a measurement signal R wirelessly transmitted from the in-vehicle device 2. The measurement signal will be described later. The portable device receiver 11 includes, for example, a low-noise amplifier, a filter, a mixer, and a demodulator circuit. When the portable device receiver 11 receives a wireless signal via the receiving antenna A11, the portable device receiver 11 performs predetermined signal processing on an electrical signal converted by the receiving antenna A11, and inputs the electrical signal into the portable device controller 13.

The transmitting antenna A12 is an antenna connected to the portable device transmitter 12. The transmitting antenna A12 converts an electrical signal input from the portable device transmitter 12 into a wireless signal, and transmits the wireless signal to the in-vehicle device 2. The transmitting antenna A12 may be a three-axis antenna having three antennas arranged perpendicular to each other, but is not limited thereto.

The portable device transmitter 12 is a transmitting circuit that transmits a wireless signal to the in-vehicle device 2 via the transmitting antenna A12, and is connected to the portable device controller 13. The wireless signal transmitted from the portable device transmitter 12 includes a measurement result signal A. The measurement result signal A is a wireless signal for identifying the location of the portable device 1 (the user) with respect to the in-vehicle device 2 (the vehicle), and includes signal strengths x of measurement signals R received at the portable device receiver 11. As will be described below, the location of the portable device 1 with respect to the in-vehicle device 2 is identified based on the signal strengths x of the received measurement signals R included in the measurement result signal A. Examples of the wireless signal transmitted from the portable device transmitter 12 include, but are not limited to, a 315 MHz ultra-high frequency (UHF) signal and a 2.4 GHz Bluetooth (registered trademark) signal. The portable device transmitter includes for example, a modulator, a mixer, a filter, and a power amplifier. When an electrical signal is input from the portable device controller 13, the portable device transmitter 12 performs predetermined processing such as modulation of the electrical signal, and wirelessly transmits the electrical signal via the transmitting antenna A12.

The receiving antenna A11 and the transmitting antenna A12 may be separate antennas. Alternatively, one antenna may be shared between the receiving antenna A11 and the transmitting antenna A12. The portable device 1 may include one or more receiving antennas A11 and one or more transmitting antennas A12. Further, the portable device receiver and the portable device transmitter 12 may be separate integrated circuits (ICs) or may be integrated into a wireless module (such as a Bluetooth module).

The portable device controller 13 is hardware for controlling the entire operation of the portable device 1, and includes a central processing unit (CPU), a read-only memory (ROM), and a random-access memory (RAM). The CPU controls components of the portable device 1 and implements functions of the portable device controller 13 by executing programs. The programs executed by the CPU may be recorded on any computer-readable recording medium, such as a compact disc (CD), a DVD, or a flash memory. The ROM stores the programs executed by the CPU and various types of data. The RAM provides a working area for the CPU. The portable device controller 13 is, for example, a microcontroller, but is not limited thereto.

The battery 14 provides power to the portable device receiver 11, the portable device transmitter 12, and the portable device controller 13.

The configuration of the portable device 1 is not limited to the example illustrated in FIG. 1. For example, if the portable device 1 is a dedicated terminal, the portable device 1 may include a locking button and an unlocking button that allow the user to manually lock and unlock the vehicle. In addition, if the portable device 1 is a portable terminal, the portable device 1 may include input devices such as a touch panel and a microphone and output devices such as a liquid crystal display and a speaker.

Next, a hardware configuration of the in-vehicle device 2 will be described. The in-vehicle device 2 is a wireless terminal that wirelessly communicates with the portable device 1, and is installed in a vehicle. The in-vehicle device 2 is connected to an electronic control unit (ECU) of the vehicle via an in-vehicle network such as a controller area network (CAN) or a local interconnect network (LIN), and controls the vehicle in response to a wireless signal transmitted from the portable device 1. In addition, the in-vehicle device 2 is supplied with power from a battery of the vehicle. The in-vehicle device 2 illustrated in FIG. 1 includes a receiving antenna A21, an in-vehicle device receiver 21, a plurality of transmitting antennas A22, an in-vehicle device transmitter 22, and an in-vehicle device controller 23.

The receiving antenna A21 is an antenna connected to the in-vehicle device receiver 21. The receiving antenna A21 receives a wireless signal transmitted from the portable device 1, converts the received wireless signal into an electrical signal, and inputs the electrical signal into the in-vehicle device receiver 21. The receiving antenna A21 may be a three-axis antenna having three antennas arranged perpendicular to each other, but is not limited thereto.

The in-vehicle device receiver 21 is a receiving circuit that receives a wireless signal transmitted from the portable device 1 via the receiving antenna A21, and is connected to the in-vehicle device controller 23. The wireless signal received by the in-vehicle device receiver 21 includes a measurement result signal A wirelessly transmitted from the portable device 1. The in-vehicle device receiver 21 includes, for example, a low-noise amplifier, a filter, a mixer, and a demodulator circuit. When the in-vehicle device receiver 21 receives a wireless signal via the receiving antenna A21, the in-vehicle device receiver 21 performs predetermined signal processing on an electrical signal converted by the receiving antenna A21, and inputs the electrical signal into the in-vehicle device controller 23.

The transmitting antennas A22 are connected to the in-vehicle device transmitter 22. Each of the transmitting antennas A22 converts an electrical signal input from the in-vehicle device transmitter 22 into a wireless signal, and transmits the wireless signal to the portable device 1. The transmitting antennas A22 may be a three-axis antenna having three antennas arranged perpendicular to each other, but is not limited thereto. In the example of FIG. 1, the in-vehicle device 2 includes three transmitting antennas A22; however, the in-vehicle device 2 may include two transmitting antennas A22 or four or more transmitting antennas A22.

The in-vehicle device transmitter 22 is a transmitting circuit that transmits a wireless signal to the portable device 1 via the transmitting antennas A22, and is connected to the in-vehicle device controller 23. The wireless signal transmitted from the in-vehicle device transmitter 22 includes a measurement signal R. The measurement signal R is a wireless signal for identifying the location of the portable device 1 (the user) with respect to the in-vehicle device 2 (the vehicle). The measurement signal R includes a measurement portion (a portion whose transmitted signal strength is constant), and a signal strength x of the received measurement portion is measured. As will be described below, the location of the portable device 1 with respect to the in-vehicle device 2 is identified based on signal strengths x of received measurement signals R measured by the portable device 1. The portable device 1 measures signal strengths x of received measurement portions included in measurement signals R as signal strengths x of the received measurement signals R. Examples of the wireless signal transmitted from the in-vehicle device transmitter 22 include, but are not limited to, a 125 kHz low-frequency (LF) signal and a 2.4 GHz Bluetooth (registered trademark) signal. The in-vehicle device transmitter 22 includes for example, a modulator, a mixer, a filter, and a power amplifier. When an electrical signal is input from the in-vehicle device controller 23, the in-vehicle device transmitter 22 performs predetermined processing such as modulation of the electrical signal, and wirelessly transmits the electrical signal via the transmitting antennas A22.

The receiving antenna A21 and the transmitting antennas A22 may be separate antennas. Alternatively, one antenna may be shared between the receiving antenna A21 and the transmitting antennas A22. The in-vehicle device 2 may include one or more receiving antennas A21. Further, the in-vehicle device receiver 21 and the in-vehicle device transmitter 22 may be separate integrated circuits (ICs) or may be integrated into a wireless module (such as a Bluetooth module).

The in-vehicle device controller 23 is hardware for controlling the entire operation of the in-vehicle device 2, and includes a CPU, ROM, and a RAM. The CPU controls components of the in-vehicle device 2 and implements functions of the in-vehicle device controller 23 by executing programs. The programs executed by the CPU may be recorded on any computer-readable recording medium, such as a CD, a DVD, or a flash memory. The ROM stores the programs executed by the CPU and various types of data. The RAM provides a working area for the CPU. The in-vehicle device controller 23 is, for example, a microcontroller, but is not limited thereto.

The configuration of the in-vehicle device 2 is not limited to the example illustrated in FIG. 1. For example, the in-vehicle device 2 may include a battery for supplying power to the in-vehicle device receiver 21, the in-vehicle device transmitter 22, and the in-vehicle device controller 23. In addition, in the example of FIG. 1, the in-vehicle device 2 includes the one in-vehicle device transmitter 22 connected to the plurality of transmitting antennas A22, but may include a plurality of in-vehicle device transmitters 22 connected to the plurality of respective transmitting antennas A22.

Figure 2:
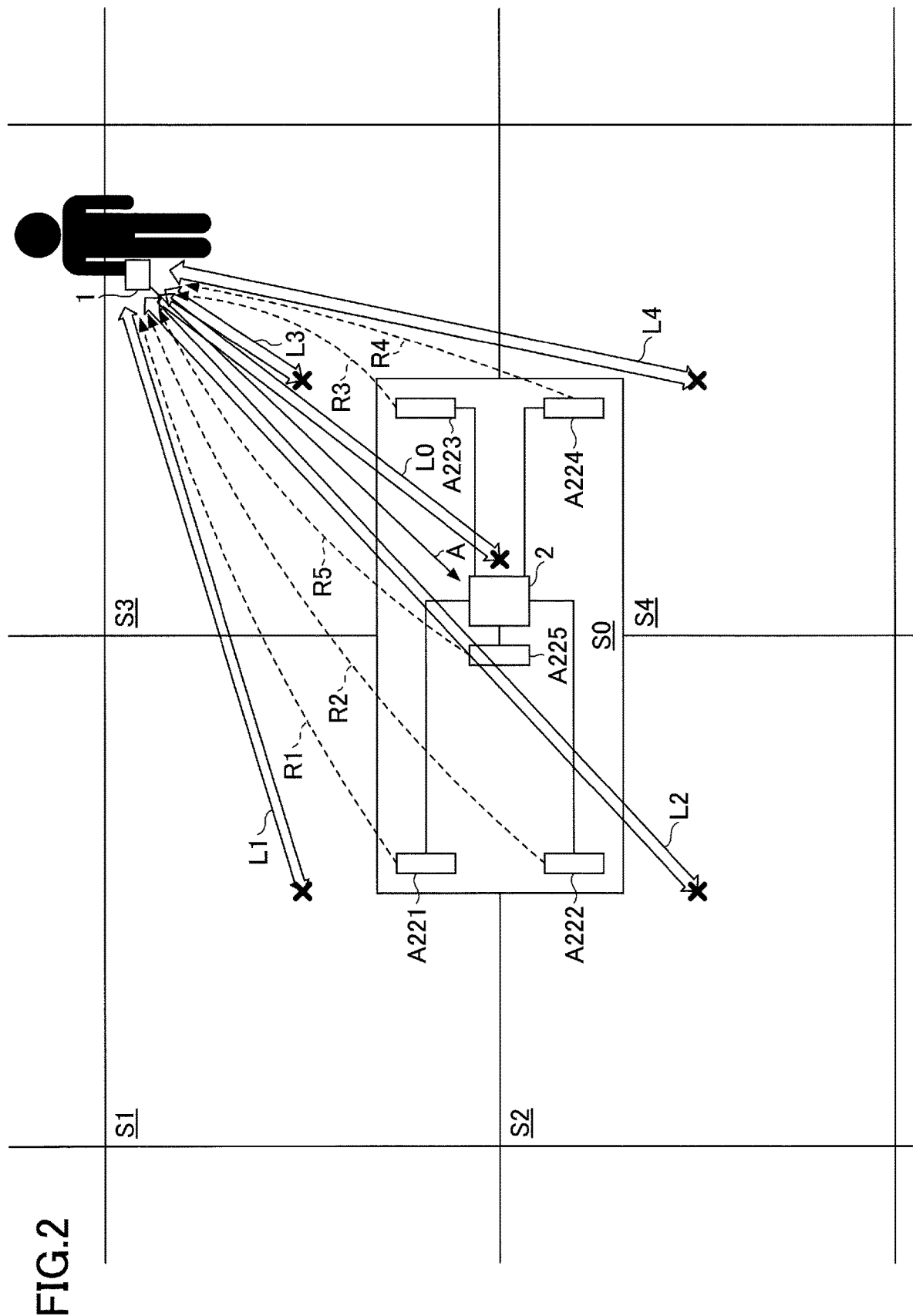
FIG. 2 is a diagram illustrating an overview of the operation of the keyless entry system.

Next, an overview of the operation of the keyless entry system 100 will be described. FIG. 2 is a diagram illustrating an overview of the operation of the keyless entry system 100. In the example of FIG. 2, the in-vehicle device 2 includes four transmitting antennas A221 to A224 installed on the bumpers (the four corners of the vehicle), and a transmitting antenna A225 installed inside the vehicle (at the center of the vehicle). The other components of the in-vehicle device 2 are collectively arranged at the center of the vehicle, and are connected to the transmitting antennas A221 to A225 via the in-vehicle network. In addition, a three-dimensional space within a given distance from the vehicle is divided to form several tens of areas around the vehicle without any gaps. Each of the areas has one representative point. In the example of FIG. 2, for convenience of explanation, four areas S1 to S4 are illustrated. Further, the interior space of the vehicle is set as an area S0. The areas S1 to S4 are preset in order to identify the location of the portable device 1. Hereinafter, the transmitting antennas A221 to A225 may be, if not distinguished, referred to as transmitting antenna(s) A22, and the areas S0 to S4 may be, if not distinguished, referred to as area(s) S.

In the present embodiment, the in-vehicle device 2 transmits measurement signals R1 to R5 from the transmitting antennas A221 to A225, respectively. When the portable device 1 has received the measurement signal R1, the portable device 1 measures a signal strength x1 of the received measurement signal R1. The same applies to the measurement signals R2 to R5. The portable device 1 receives measurement signals R over a predetermined period of time, and transmits a measurement result signal A that includes signal strengths x of the measurement signals R received over the predetermined period of time. When the in-vehicle device 2 has received the measurement result signal A, the in-vehicle device 2 calculates distances L0 to L4 to the areas S0 to S4, respectively, based on the received signal strengths x included in the measurement result signal A, and identifies the location of the portable device 1 based on the calculated distances L0 to L4. Herein, a distance to an area S means a distance to a representative point of the area S.

For example, the in-vehicle device 2 calculates Mahalanobis distances MD as the distances L. The Mahalanobis distances MD from the portable device 1 to the areas S are calculated by the following formulas.

$$MD^2 = [x_1 - \mu_1 \quad \cdots \quad x_n - \mu_n] \begin{bmatrix} r_{11} & \cdots & r_{n1} \\ \vdots & \ddots & \vdots \\ r_{1n} & \cdots & r_{nn} \end{bmatrix}^{-1} \begin{bmatrix} x_1 - \mu_1 \\ \vdots \\ x_n - \mu_1 \end{bmatrix} \quad (1)$$

$$r_{ij} = \frac{1}{m} \sum_{p=1}^{m} (X_{ip} \times X_{jp}) \quad (2)$$

$$X_{ip} = \frac{x_{ip} - \mu_i}{\sigma_i} \quad (3)$$

In the formulas (1) to (3), n represents the number of transmitting antennas A22 included in the in-vehicle device 2. In the example of FIG. 2, n is 5. xi represents a signal strength xi of a received measurement signal Ri, which has been transmitted from an $i^{th}$ transmitting antenna A22$i$. m represents the number of signal strengths xi of the received measurement signal Ri that have been measured before the vehicle is put on the market by a measuring instrument (such as the most commonly used portable instrument) belonging to a corresponding area S. $x_{ip}$ represents a signal strength xi of the received measurement signal Ri that has been measured $p^{th}$ (p=1 to m) by the measuring instrument belonging to the area S. $\mu_i$ represents an average value of the m number of signal strengths $x_{ip}$ ($\mu_i = \Sigma x_{ip}/m$) preliminarily measured by the measuring instrument belonging to the area S. $\mu_i$ corresponds to a reference value for the signal strength xi of the received measurement signal Ri, which is preliminarily set for the area S. $\sigma_i$ represents the standard deviation of the received signal strength $x_{ip}$ preliminarily measured by the measuring instrument belonging to the area S. If the distances L are the Mahalanobis distances MD, $\mu_i$ and $r_{ij}$ of all transmitting antennas A22i are preliminarily stored in the ROM of the in-vehicle device controller 23 as reference values and coefficients to be used to calculate the distances L to the areas S. It should be noted that parameters such as m may be prepared beforehand for each vehicle production lot or for each vehicle.

In the example of FIG. 2, a reference value $\mu_i$ and a coefficient $r_{ij}$ for the area S0 and a received signal strength x included in a measurement result signal A are substituted into the formula (1) to calculate the distance L0 (the Mahalanobis distance MD) from the portable device 1 to the area S0. The same applies to the distances L1 to L4.

Further, as the distances L to the areas S, the in-vehicle device 2 may calculate Euclidean distances ED. The Euclidean distances ED from the portable device 1 to the areas S are calculated by the following formula.

$$ED^2 = (x_1-\mu_1)^2 + (x_2-\mu_2)^2 + \ldots + (x_n-\mu_n)^2 \quad (4)$$

In the formula (4), $\mu_i$ represents the same as the above. If the distances L are the Euclidean distances ED, $\mu_i$ values of all the transmitting antennas A22i are preliminarily stored in the ROM of the in-vehicle device controller 23 as reference values for the respective areas S to be used to calculate the distances L.

In the example of FIG. 2, the in-vehicle device 2 calculates the distance L0 (the Euclidean distance ED) from the portable device 1 to the area S0 by substituting a reference value $\mu_i$ for the area S0 and a received signal strength x included in a measurement result signal A into the formula (4). The same applies to the distances L1 to L4.

After the in-vehicle device 2 calculates the distances L0 to L4 from the portable device 1 to the areas S0 to S4, the in-vehicle device 2 identifies an area S whose distance L is minimal from among the areas S0 to S4, as an area S to which the portable device 1 belongs (namely, as the location of the portable device 1). In the example of FIG. 2, the area S3 is identified as the area S to which the portable device 1 belongs. It should be noted that when the minimal distance L is equal to or exceeds a threshold Lth, the in-vehicle device 2 may determine that the portable device 1 does not belong to any of the areas S.

If signal strengths x1 to x5 of the received measurement signals R1 to R5 included in a measurement result signal A are sufficiently large, the in-vehicle device 2 can accurately calculate the distances L0 to L4 and identify the location of the portable device 1 by using the above-described method. However, if the portable device 1 fails to receive a measurement signal R or if a signal strength x of a measurement signal R received by the portable device 1 is weak because the portable device 1 is located away from the in-vehicle device, the in-vehicle device 2 would not be able to accurately calculate the distances L0 to L4 based on received signal strengths x included in a measurement result signal A, and thus, would not be able to accurately identify the location of the portable device 1. In other words, there may be a high possibility that an area S to which the portable device 1 belongs fails to be correctly identified.

In light of the above, according to the present embodiment, the in-vehicle device 2 determines whether to identify the location of the portable device 1, based on received signal strengths x included in a measurement result signal A. When it is assumed that the portable device 1 is located away from the in-vehicle device 2, the in-vehicle device 2 determines not to identify the location of the portable device 1. Conversely, when it is assumed that the portable device 1 is not located away from the in-vehicle device 2, the in-vehicle device 2 determines to identify the location of the portable device 1. Accordingly, it is possible to prevent reduction in accuracy of identifying the location of the portable device 1. Methods for determining whether to identify the location of the portable device 1 will be described later.

In the above example, the Mahalanobis distances MD and the Euclidean distances ED have been described as the distances L; however, the distances L are not limited to the Mahalanobis distances MD and the Euclidean distances ED. The in-vehicle device 2 may use any method to calculate the distances L based on signal strengths xi of received measurement signals Ri. Further, the number and the arrangement of the transmitting antennas A22 and the areas S are not limited to the example of FIG. 2. In addition, in the example of FIG. 2, the in-vehicle device 2 includes the one in-vehicle device transmitter 22; however, the in-vehicle device 2 may include a plurality of in-vehicle device transmitters 22 provided for the respective transmitting antennas A22. Further, the transmitting antennas A22 and other components may be connected wirelessly or via a dedicated cable instead of the in-vehicle network.

Next, a functional configuration of the portable device controller 13 will be described. The portable device controller 13 of FIG. 1 includes a portable device storage 131, an measurement result signal generating unit 132, and a received signal strength measuring unit 133. These functions are implemented by causing the CPU of the portable device controller 13 to execute a program and work with other hardware.

The portable device storage 131 is provided in at least one of the ROM and the RAM of the portable device controller 13. The portable device storage 131 stores a portable device ID that is identification information of the portable device 1, an in-vehicle device ID that is identification information of the in-vehicle device 2 associated with the portable device 1, data for wirelessly communicating with the in-vehicle device 2, and other data. The portable device ID and the in-vehicle device ID may be MAC addresses, but are not limited thereto.

The measurement result signal generating unit 132 generates a measurement result signal A (an electrical signal) that includes signal strengths x of measurement signals R received at the portable device receiver 11 for each predetermined period of time, and the measurement result signal generating unit 132 inputs the generated measurement result signal A into the portable device transmitter 12.

The received signal strength measuring unit 133 measures the signal strengths x of the measurement signals R received at the portable device receiver 11, and inputs the measured signal strengths x of the received measurement signals R into the measurement result signal generating unit 132.

Next, a functional configuration of the in-vehicle device controller 23 will be described. The in-vehicle device controller 23 of FIG. 1 includes an in-vehicle device storage 231, a measurement signal generating unit 232, a distance calculating unit 233, an area identifying unit 234, and an identification determining unit 235. These functions are implemented by causing the CPU of the in-vehicle device controller 23 to execute a program and work with other hardware.

The in-vehicle device storage 231 is provided in at least one of the ROM and the RAM of the in-vehicle device controller 23. The in-vehicle device storage 231 stores an in-vehicle device ID that is identification information of the in-vehicle device 2, a portable device ID that is identification information of the portable device 1 associated with the in-vehicle device 2, data for wirelessly communicating with the portable device 1, antenna IDs that are identification information of the transmitting antennas A22, data (a reference value and a coefficient set for each area S) for calculating distances L, data for determining whether to identify the location of the portable device 1, and other data.

The measurement signal generating unit 232 generates a measurement signal R (an electrical signal) for each predetermined period of time, and inputs the generated measurement signal R into the in-vehicle device transmitter 22.

The distance calculating unit 233 calculates distances L from the portable device 1 to areas S, based on received signal strengths xi included in a measurement result signal A received at the in-vehicle device receiver 21 and reference values $\mu_i$ set for the respective areas S. The distances L are calculated as described above. The distance calculating unit 233 inputs the calculated distances L into the area identifying unit 234.

The area identifying unit 234 identifies an area S to which the portable device 1 belongs (namely, the location of the portable device 1) based on the distances L from the portable device 1 to the areas S.

The identification determining unit 235 determines whether to identify an area S to which the portable device 1 belongs (the location of the portable device 1) based on signal strengths x included in a measurement result signal A received at the in-vehicle device receiver 21. In the following, first to fifth determination methods will be described.

In the first determination method, the identification determining unit 235 determines whether to identify the location of the portable device 1, based on whether a received signal strength x5 of the measurement signal R5, which has been transmitted from the transmitting antenna A225 installed inside the vehicle, is included in a measurement result signal A. Specifically, if the received signal strength x5 is included in the measurement result signal A, the identification determining unit 235 determines to identify the location of the portable device 1. If the received signal strength x5 is not included in the measurement result signal A, the identification determining unit 235 determines not to identify the location of the portable device 1.

In the second determination method, the identification determining unit 235 determines whether to identify the location of the portable device 1, based on the level of the received signal strength x5 of the measurement signal R5, which has been transmitted from the transmitting antenna A225 installed inside the vehicle. Specifically, if the received signal strength x5 is equal to or exceeds a threshold xth1 (a first threshold), the identification determining unit 235 determines to identify the location of the portable device 1. Conversely, if the received signal strength x5 is below the threshold xth1, the identification determining unit 235 determines not to identify the location of the portable device 1. The threshold xth1 is preliminarily stored in the in-vehicle device storage 231 and is used as data for determining whether to identify the location of the portable device 1.

If the received signal strength x5 is not included in the measurement result signal A, or if the received signal strength x5 included in the measurement result signal A is weak, the possibility of the portable device 1 being located away from the in-vehicle device 2 would be high. Therefore, according to the first and second determination methods, it is possible not to identify the location of the portable device 1 when the portable device 1 is located away from the in-vehicle device 2, thereby preventing reduction in accuracy of identifying the location of the portable device 1.

Further, in a case where the portable device 1 is located inside the vehicle, it is unlikely that the received signal strength x5 is not included in the measurement result signal A or the received signal strength x5 included in the measurement result signal A is weak. Namely, when the received signal strength x5 is not included in the measurement result signal A, or when the received signal strength x5 included in the measurement result signal A is weak, the portable device 1 is assumed to be located outside the vehicle. In such cases of the signal being not included or weak, the location of the portable device 1 is determined not to be identified, thereby avoiding a situation in which the portable device 1 located outside the vehicle is incorrectly identified as being located inside the vehicle.

In the keyless entry system 100, when it is determined that the portable device 1 is located inside the vehicle (the portable device belongs to the area S0), vehicle control such as starting the engine is generally performed. Therefore, if the portable device 1 located outside the vehicle is incorrectly identified as being located inside the vehicle, unexpected vehicle control would be performed. As a result, the safety and security of the vehicle may decrease. According to the present embodiment, it is possible to avoid a situation in which the portable device 1 located outside the vehicle is incorrectly identified as being located inside the vehicle, thereby improving the safety and security of the vehicle.

In the third determination method, the identification determining unit 235 determines whether to identify the location of the portable device 1, based on the number of received signal strengths x not included in the measurement result signal A. Specifically, if the number of received signal strengths x not included in the measurement result signal A is zero or one, the identification determining unit 235 determines to identify the location of the portable device 1. If the number of received signal strengths x not included in the measurement result signal A is two or more, the identification determining unit 235 determines not to identify the location of the portable device 1. In the example of FIG. 2, if four or more received signal strengths x of measurement signals R that have been transmitted from respective transmitting antennas A22 are included in the measurement result signal A, the identification determining unit 235 determines to identify the location of the portable device 1. If three or less received signal strengths x of measurement signals R that have been transmitted from respective transmitting antennas A22 are included in the measurement result signal A, the identification determining unit 235 determines not to identify the location of the portable device 1.

In the fourth determination method, the identification determining unit 235 determines whether to identify the location of the portable device 1, based on the levels of all the received signal strengths included in the measurement result signal A. Specifically, if at least one received signal strength included in the measurement result signal A is equal to or exceeds a threshold xth2 (a second threshold), the identification determining unit 235 determines to identify the location of the portable device 1. If all the received signal strengths included in the measurement result signal A are below the threshold xth2, the identification determining unit 235 determines not to identify the location of the portable device 1. The threshold xth2 is preliminarily stored in the in-vehicle device storage 231 and is used as data for determining whether to identify the location of the portable device 1.

In the fifth determination method, the identification determining unit 235 determines whether to identify the location of the portable device 1, based on a difference between a maximum value xmax and a minimum value xmin of the received signal strengths included in the measurement result signal A. Specifically, if the difference between the maximum value xmax and the minimum value xmin of the received signal strengths x included in the measurement result signal A is equal to or exceeds a threshold xth3 (a third threshold), the identification determining unit 235 determines to identify the location of the portable device 1. If the difference between the maximum value xmax and the minimum value xmin of the received signal strengths x included in the measurement result signal A is below the threshold xth3, the identification determining unit 235 determines not to identify the location of the portable device 1. The threshold xth3 is preliminarily stored in the in-vehicle device storage 231 and is used as data for determining whether to identify the location of the portable device 1.

If two or more received signal strengths x are not included in the measurement result signal A, all the received signal strengths x included in the measurement result signal A are weak, or a difference between a maximum value xmax and a minimum value xmin of the received signal strengths x included in the measurement result signal A is small, the possibility of the portable device 1 being located away from the in-vehicle device would be significantly high. Therefore, according to the third to fifth determination methods, it is possible not to identify the location of the portable device 1 when the portable device 1 is located away from the in-vehicle device 2, thereby preventing reduction in accuracy of identifying the location of the portable device 1.

It should be noted that the determination methods are not limited to the above-described examples. The identification determining unit 235 may use a combination of two or more of the first to fifth determination methods. In this way, it is further possible not to identify the location of the portable device 1 when the portable device 1 is located away from the in-vehicle device 2, thereby further preventing reduction in accuracy of identifying the location of the portable device 1.

Next, an operation of the keyless entry system 100 according to the present embodiment will be described. In the following, a standard for wireless communication between the portable device 1 and the in-vehicle device 2 is assumed to be Bluetooth.

Figure 3:
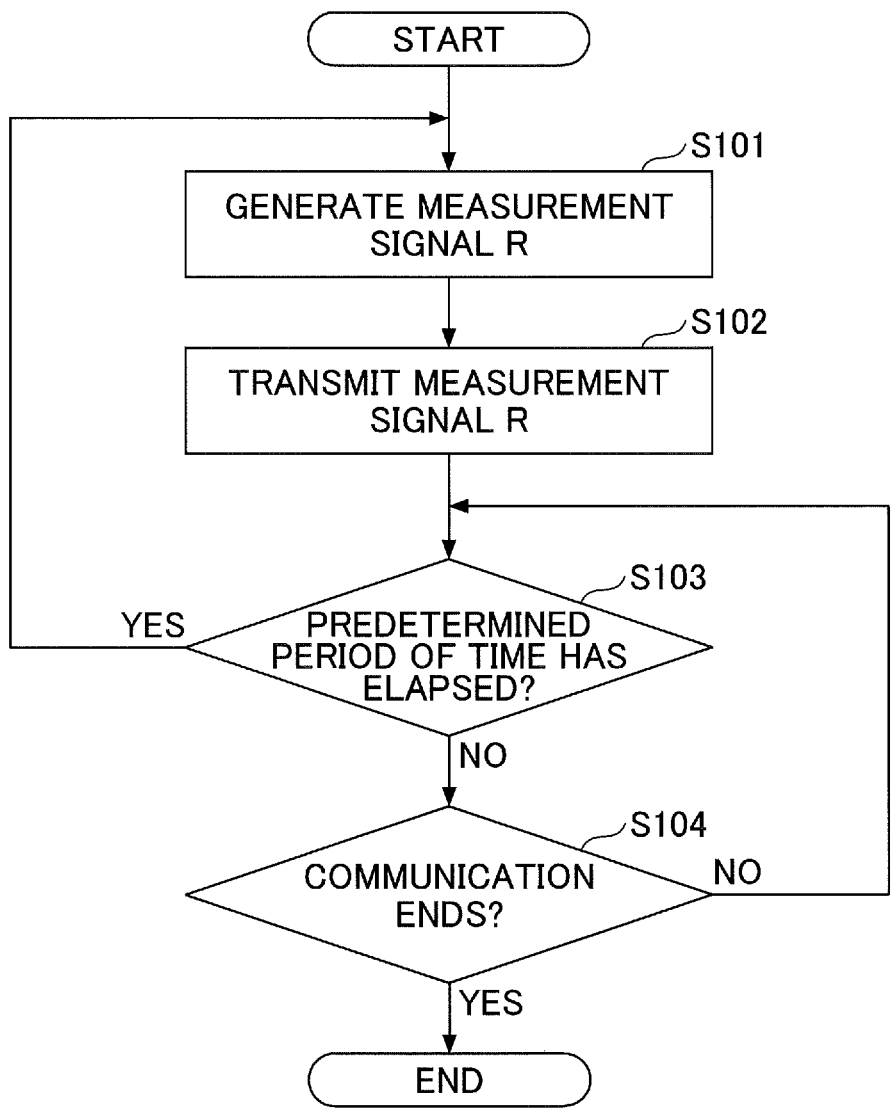
FIG. 3 is a flowchart illustrating an example of a transmitting process performed by an in-vehicle device for a measurement signal R.

First, a transmitting process performed by the in-vehicle device 2 for a measurement signal R will be described. FIG. 3 is a flowchart illustrating an example of a transmitting process performed by the in-vehicle device 2 for a measurement signal R. The transmitting process illustrated in FIG. 3 is initiated upon the connection of the in-vehicle device 2 to the portable device 1. In the following, it is assumed that measurement signals R are transmitted in the order from the transmitting antennas A221 to A225.

Upon the connection of the in-vehicle device 2 to the portable device 1, the measurement signal generating unit 232 reads, from the in-vehicle device storage 231, the in-vehicle device ID, the portable device ID, and the antenna ID of the transmitting antenna A221 from which to transmit a measurement signal R1. Then, the measurement signal generating unit 232 generates a measurement signal R1 that includes the read in-vehicle device ID (transmission source), the portable device ID (transmission destination), the antenna ID of the transmitting antenna A221, and a measurement portion (step S101). The measurement signal generating unit 232 inputs the generated measurement signal R1 into the in-vehicle device transmitter 22.

When the measurement signal R1 is input, the in-vehicle device transmitter 22 wirelessly transmits the measurement signal R1 from the transmitting antenna A221 (step S102). The in-vehicle device transmitter 22 may refer to the antenna ID included in the measurement signal R1 to select the transmitting antenna A221 as a transmitting antenna A22 from which to transmit the measurement signal R1. Alternatively, the measurement signal generating unit 232 may instruct the in-vehicle device transmitter 22 to transmit the measurement signal R1 from the transmitting antenna A221.

When a predetermined period of time has elapsed after the transmission of the measurement signal R1 (yes in S103), the process returns to the step S101, and the measurement signal generating unit 232 generates a measurement signal R2. The in-vehicle device transmitter 22 wirelessly transmits the measurement signal R2 from the transmitting antenna A222. Subsequently, the in-vehicle device 2 sequentially transmits measurement signal R3 to R5 each time the predetermined period of time has elapsed. When the in-vehicle device 2 transmits the measurement signal R5, the in-vehicle device 2 transmits measurement signals again starting from a measurement signal R1. The in-vehicle device 2 repeats steps S101 to S103 until the communication with the portable device 1 ends. When the communication with the portable device 1 ends (yes in S104), the in-vehicle device 2 ends the transmitting process illustrated in FIG. 3.

With the above process, it becomes possible for the in-vehicle device transmitter 22 to transmit a measurement signal R from via a corresponding transmitting antenna A22 of the plurality of the transmitting antennas A22 each time the predetermined period of time has elapsed. It should be noted that the order of transmitting the measurement signals R from the transmitting antennas A22 may be set as desired.

Figure 4:
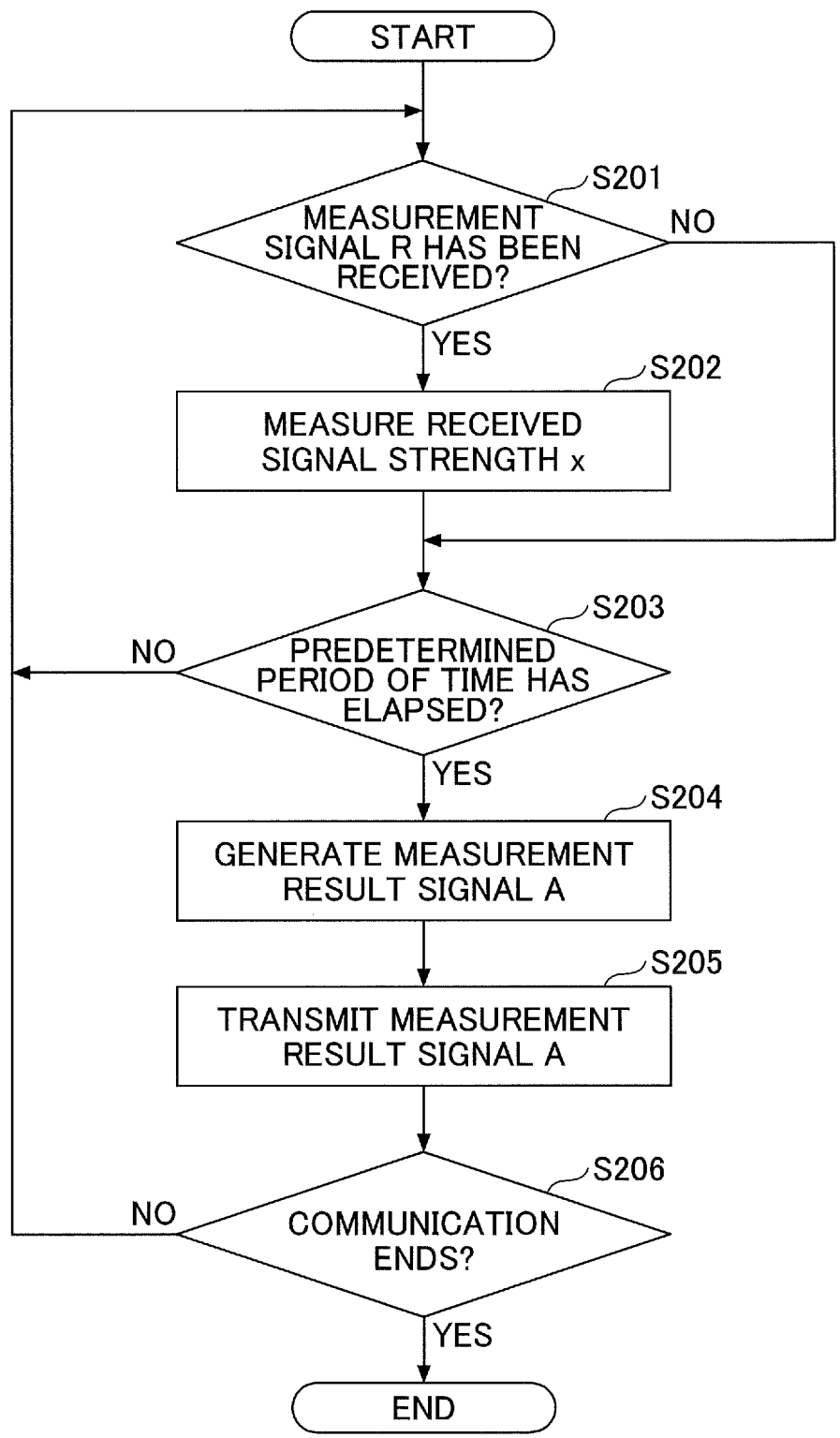
FIG. 4 is a flowchart illustrating an example of a transmitting/receiving process performed by a portable device.

Next, a transmitting/receiving process performed by the portable device 1 will be described. FIG. 4 is a flowchart illustrating an example of a transmitting/receiving process performed by the portable device 1. The transmitting/receiving process illustrated in FIG. 4 is initiated upon the connection of the portable device 1 to the in-vehicle device 2.

Upon the connection of the portable device to the in-vehicle device 2, the portable device receiver 11 starts receiving a measurement signal R from the in-vehicle device 2 (step S201). When a measurement signal R has been received from the in-vehicle device 2 (yes in step S201), the portable device receiver 11 inputs the received measurement signal R into the received signal strength measuring unit 133.

When the measurement signal R is input, the received signal strength measuring unit 133 measures a received signal strength x of (a measurement portion of) the input measurement signal R, associates the measured received signal strength x with an antenna ID included in the input measurement signal R, and inputs the received signal strength x into the measurement result signal generating unit 132 (step S202). The portable device 1 repeats steps S201 and S202 until a predetermined period of time has elapsed.

The period of time during which the portable device receiver 11 receives measurement signals R is set such that the measurement signals R1 to R5 can be received.

When the predetermined period of time has elapsed (yes in step S203), the measurement result signal generating unit 132 reads, from the portable device storage 131, the portable device ID and the in-vehicle device ID. The measurement result signal generating unit 132 then generates a measurement result signal A that includes the read portable device ID (transmission source) and the in-vehicle device ID (transmission destination), and also includes the received signal strengths x that have been associated with the respective antenna IDs and input from the received signal strength measuring unit 133 for the predetermined period of time (step S204). The measurement result signal generating unit 132 inputs the generated measurement result signal A into the portable device transmitter 12.

When the measurement result signal A is input, the portable device transmitter 12 wirelessly transmits the input measurement result signal A from the transmitting antenna A12 (step S205). The portable device 1 repeats steps S201 to S205 until the communication with the in-vehicle device 2 ends. When the communication with the in-vehicle device 2 ends (yes in step S206), the portable device 1 ends the transmitting/receiving process illustrated in FIG. 4.

With the above process, it becomes possible for the portable device 1 to transmit a measurement result signal A each time the predetermined period of time has elapsed. When the portable device receiver 11 receives the measurement signals R1 to R5 from the transmitting antenna A221 to A225 during the predetermined period of time, the measurement result signal A includes the signal strengths x1 to x5 of all the received measurement signals R1 to R5. Conversely, when the portable device receiver 11 is unable to receive measurement signals R from one or more transmitting antennas A22, the measurement result signal A does not include signal strengths x of the not-received measurement signals R transmitted from the one or more transmitting antennas A22.

Figure 5:
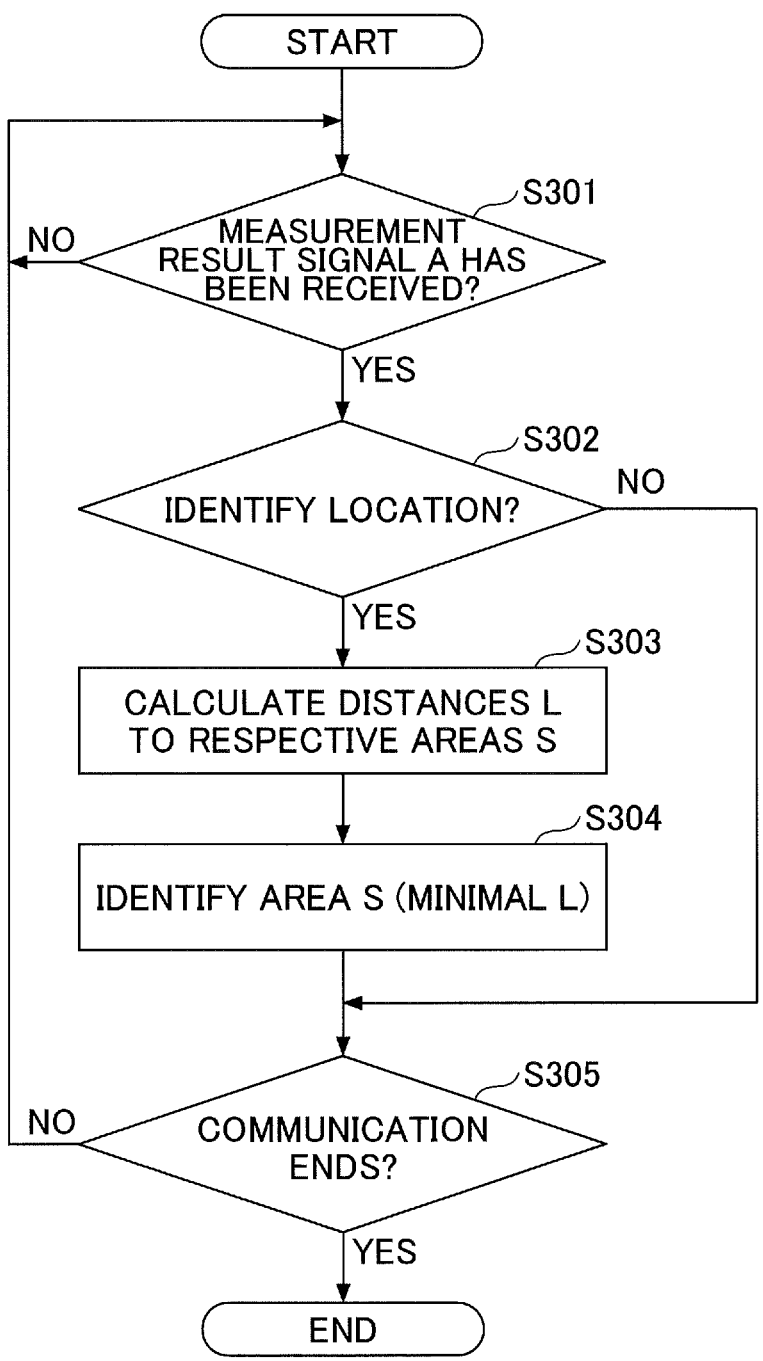
FIG. 5 is a flowchart illustrating an example of a receiving process performed by the in-vehicle device for a measurement result signal A.

Next, a receiving process performed by the in-vehicle device 2 to a measurement result signal A will be described. FIG. 5 is a flowchart illustrating an example of a receiving process performed by the in-vehicle device 2 for a measurement result signal A. The receiving process illustrated in FIG. 5 is initiated upon the connection of the in-vehicle device 2 to the portable device 1. It should be noted that the receiving process illustrated in FIG. 5 may be performed concurrently with the transmitting process illustrated in FIG. 3, or the receiving process illustrated in FIG. 5 and the transmitting process illustrated in FIG. 3 may be alternately performed. Further, distances L are assumed to be Mahalanobis distances.

Upon the connection of the in-vehicle device 2 to the portable device 1, the in-vehicle device receiver 21 starts reception for a measurement result signal A from the portable device (step S301). When a measurement result signal A has been received from the portable device 1 (yes in step S301), the in-vehicle device receiver 21 inputs the received measurement result signal A into the distance calculating unit 233.

When the measurement result signal A is input, the identification determining unit 235 determines whether to identify the location of the portable device 1 based on the received signal strengths x included in the input measurement result signal A (step S302). When the identification determining unit 235 has determined not to identify the location of the portable device 1 (no in step S302), the process proceeds to step S305. Conversely, when the identification determining unit 235 has determined to identify the location of the portable device 1 (yes in step S302), the identification determining unit 235 inputs the measurement result signal A into the distance calculating unit 233.

When the measurement result signal A is input, the distance calculating unit 233 reads the reference values $\mu_k$ and the coefficients $r_{k1}$ set for the areas S from the in-vehicle device storage 231. The distance calculating unit 233 then substitutes the read reference values $\mu_k$ and coefficients $r_{k1}$, and the signal strengths xi of the received measurement signals Ri into the formula (1), and calculates distances L from the portable device 1 to the areas S (step S303). Upon the calculation of the distances L to the respective areas S, the distance calculating unit 233 inputs the calculated distances L into the area identifying unit 234.

When the distances L to the respective areas S are input, the area identifying unit 234 identifies an area S having a minimal distance L (minimal L) as an area S to which the portable device 1 belongs (step S304). For example, if the distance L1 is minimal from among the distances L0 to L4, the area S1 is identified as an area S to which the portable device 1 belongs.

The in-vehicle device 2 repeats steps S301 to S304 until the communication with the portable device 1 ends. When the communication with the portable device 1 ends (yes in step S305), the in-vehicle device 2 ends the receiving process illustrated in FIG. 5.

With the above process, the in-vehicle device 2 can identify an area S to which the portable device 1 belongs (namely, the location of the portable device 1), based on received signal strengths x included in a measurement result signal A each time a measurement result signal A is received. After identifying the area S to which the portable device 1 belongs, the in-vehicle device 2 may request the ECU of the vehicle to perform control according to the identified area S. For example, when the portable device 1 belongs to an area S located in the vicinity of the vehicle, the in-vehicle device 2 may request the ECU to unlock the vehicle. In addition, depending on the area S, it is possible to request the ECU to turn lamps on or off or to unlock the vehicle.

Figure 6:
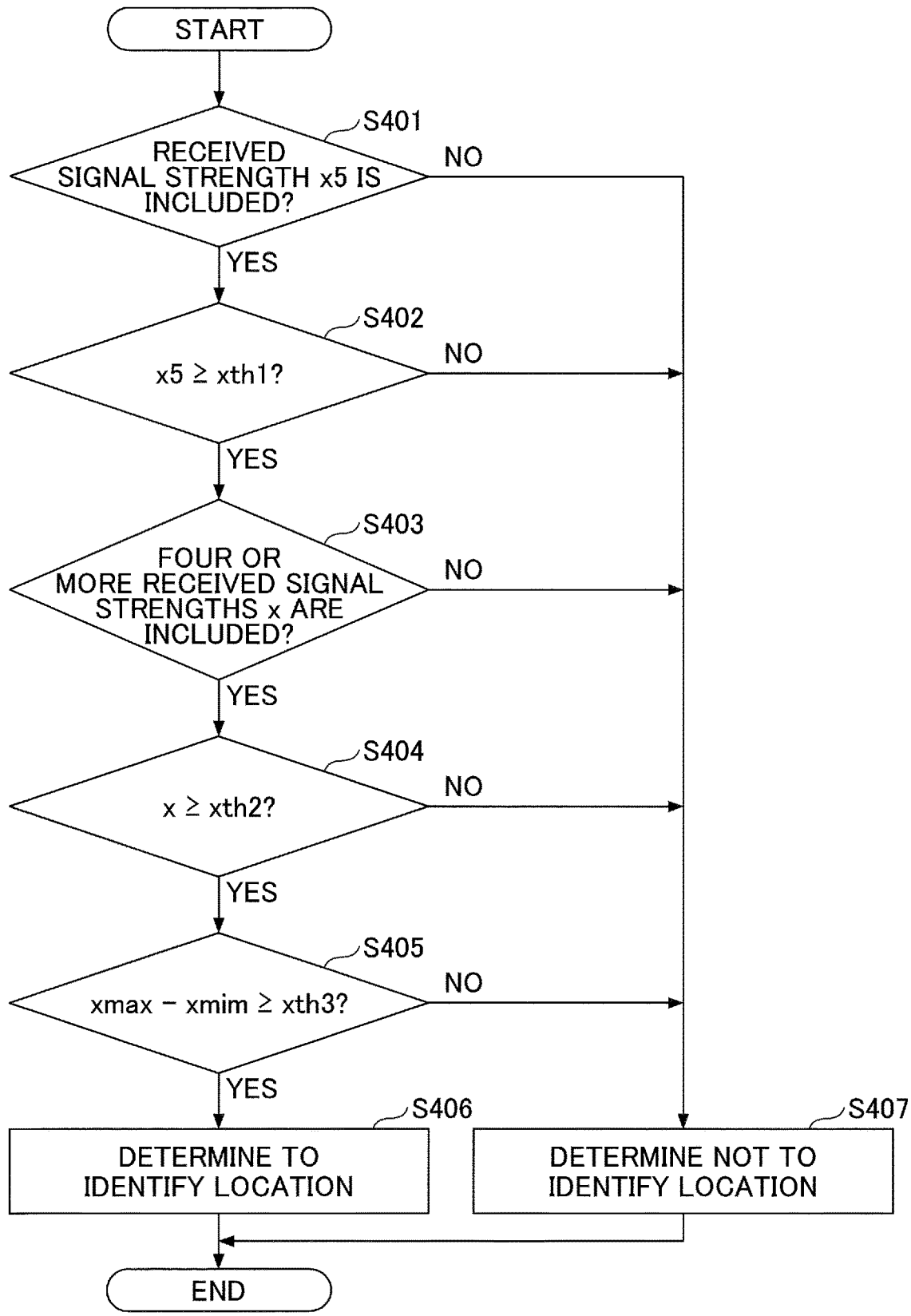
FIG. 6 is a flowchart illustrating an example of a process for determining whether to identify the location of the portable device.

Next, a determination process performed by the in-vehicle device 2 will be described. FIG. 6 is a flowchart illustrating an example of a process for determining whether to identify the location of the portable device 1. The determination process of FIG. 6 corresponds to step S302 of FIG. 5.

When a measurement result signal A is input, the identification determining unit 235 checks whether a received signal strength x5 (a received signal strength of the measurement signal R5 that has been transmitted from the transmitting antenna A225 installed in the vehicle) is included in the input measurement result signal A (step S401). Step S401 corresponds to the above-described first determination method. If the received signal strength x5 is not included in the measurement result signal A (no in step S401), it is assumed that the portable device 1 is located away from the in-vehicle device 2. Therefore, the identification determining unit 235 determines not to identify the location of the portable device 1 (step S407).

If the received signal strength x5 is included in the measurement result signal A (yes in step S401), the identification determining unit 235 reads the threshold xth1 from the in-vehicle device storage 231, and checks whether the received signal strength x5 is equal to or exceeds the threshold xth1 (step S402). Step S402 corresponds to the above-described second determination method. If the received signal strength x5 is below the threshold xth1 (no in step S402), it is assumed that the portable device 1 is located away from the in-vehicle device 2. Thus, the identification determining unit 235 determines not to identify the location of the portable device 1 (step S407).

When it is determined that the received signal strength x5 is equal to or exceeds the threshold xth1 (yes in step S402), the identification determining unit 235 checks whether four or more received signal strengths x are included in the measurement result signal A (checks whether the number of received signal strengths not included in the measurement result signal A is zero or one) (step S403). Step S403 corresponds to the above-described third determination method. If the number of received signal strengths included in the measurement result signal A is three or less (two or more received signal strengths are not included in the measurement result signal A) (no in step S403), it is assumed that the portable device 1 is located away from the in-vehicle device 2. Therefore, the identification determining unit 235 determines not to identify the location of the portable device 1 (step S407).

When it is determined that the measurement result signal A includes four or more received signal strengths x (the number of received signal strengths not included in the measurement result signal A is zero or one) (yes in step S403), the identification determining unit 235 reads the threshold xth2 from the in-vehicle device storage 231, and checks whether at least one of the received signal strengths x included in the measurement result signal A is equal to or exceeds the threshold xth2 (step S404). Step S404 corresponds to the fourth determination method. If all of the received signal strengths x included in the measurement result signal A fall below the threshold xth2 (no in step S404), it is assumed that the portable device 1 is located away from the in-vehicle device 2. Therefore, the identification determining unit 235 determines not to identify the location of the portable device 1 (step S407).

When it is determined that at least one of the received signal strengths x included in the measurement result signal A is equal to or exceeds the threshold xth2 (yes in step S404), the identification determining unit 235 reads the threshold xth3 from the in-vehicle device storage 231, and checks whether a difference between a maximum value xmax and a minimum value xmin of the received signal strengths x included in the measurement result signal A is equal to or exceeds the threshold xth3 (step S405). Step S405 corresponds to the above-described fifth determination method. If the difference between the maximum value xmax and the minimum value xmin is below the threshold xth3 (no in step S405), it is assumed that the portable device 1 is located away from the in-vehicle device 2. Therefore, the identification determining unit 235 determines not to identify the location of the portable device 1 (step S407).

Conversely, if the difference between the maximum value xmax and the minimum value xmin is equal to or exceeds the threshold xth3, it is assumed that the portable device 1 is not located away from the in-vehicle device 2 (the portable device 1 is located in the vicinity of the in-vehicle device 2). Therefore, the identification determining unit 235 determines to identify the location of the portable device 1 (step S406).

With the above-described process, the identification determining unit 235 can determine whether to identify the location of the portable device 1, based on the received signal strengths x included in the measurement result signal A. Specifically, when it is assumed that the portable device 1 is located away from the in-vehicle device 2, the identification determining unit 235 determines not to identify the location of the portable device 1. Conversely, when it is assumed that the portable device 1 is not located away from the in-vehicle device 2, the identification determining unit 235 determines to identify the location of the portable device 1.

In the example of FIG. 6, the identification determining unit 235 uses all the first to fifth determination methods; however, the identification determining unit 235 may use only one of the determination methods, or may use two or more of the determination methods.

As described above, according to the present embodiment, the in-vehicle device 2 can determine whether to identify the location of the portable device 1, based on received signal strengths x included in a measurement result signal A. Specifically, when it is assumed that the portable device 1 is located away from the in-vehicle device 2, the in-vehicle device 2 determines not to identify the location of the portable device 1. Conversely, when it is assumed that the portable device 1 is not located away from the in-vehicle device 2, the in-vehicle device 2 determines to identify the location of the portable device 1. Accordingly, it is possible to prevent reduction in accuracy of identifying the location of the portable device 1, namely to improve the accuracy of identifying the location of the portable device 1. In other words, it is possible to provide the keyless entry system 100 that can accurately identify the location of the portable device 1 based on signal strengths x of received measurement signals R. Further, according to at least one of the first determination method and the second determination method, it is possible to avoid a situation in which the portable device 1 located outside the vehicle is incorrectly identified as being located inside the vehicle, thereby improving the safety and security of the vehicle.

Figure 7:
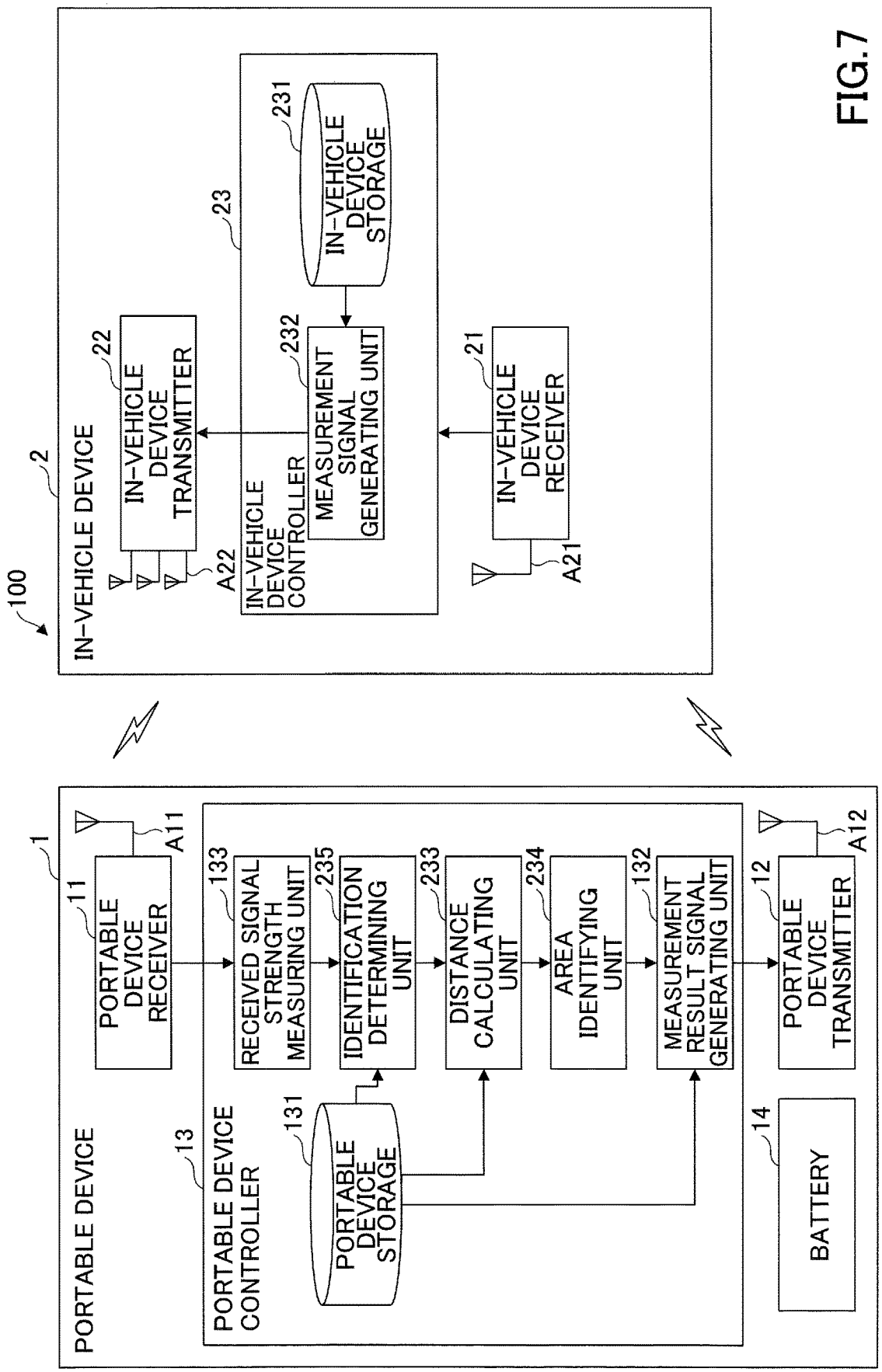
FIG. 7 is a diagram illustrating a first variation of the keyless entry system.

FIG. 7 is a diagram illustrating a first variation of the keyless entry system 100 according to the present embodiment. In the first variation, the distance calculating unit 233, the area identifying unit 234, and the identification determining unit 235 are provided in the portable device controller 13. The distance calculating unit 233, the area identifying unit 234, and the identification determining unit 235 are implemented by causing the CPU of the portable device controller 13 to execute a program and work with other hardware. In addition, the portable device storage 131 stores reference values and coefficients for calculating distances L, and also stores thresholds xth1 to xth3 for determining whether to identify the location of the portable device 1.

In the first variation, received signal strengths x measured by the received signal strength measuring unit 133 are input into the identification determining unit 235, and the identification determining unit 235 determines whether to identify the location of the portable device 1 based on the input received signal strengths x and also the thresholds xth1 to xth3 stored in the portable device storage 131. When the identification determining unit 235 has determined to identify the location of the portable device 1, the received signal strengths x measured by the received signal strength measuring unit 133 are input into the distance calculating unit 233. The distance calculating unit 233 calculates distances L from the portable device 1 to the areas S based on the input received signal strengths x and also the reference values $\mu_i$ and the coefficients $r_{ij}$ stored in the portable device storage 131. The area identifying unit 234 identifies an area S to which the portable device 1 belongs, based on the distances L calculated by the distance calculating unit 233. The measurement result signal generating unit 132 wirelessly transmits, to the in-vehicle device 2, a measurement result signal A that includes the identified area S to which the portable device 1 belongs.

Figure 8:
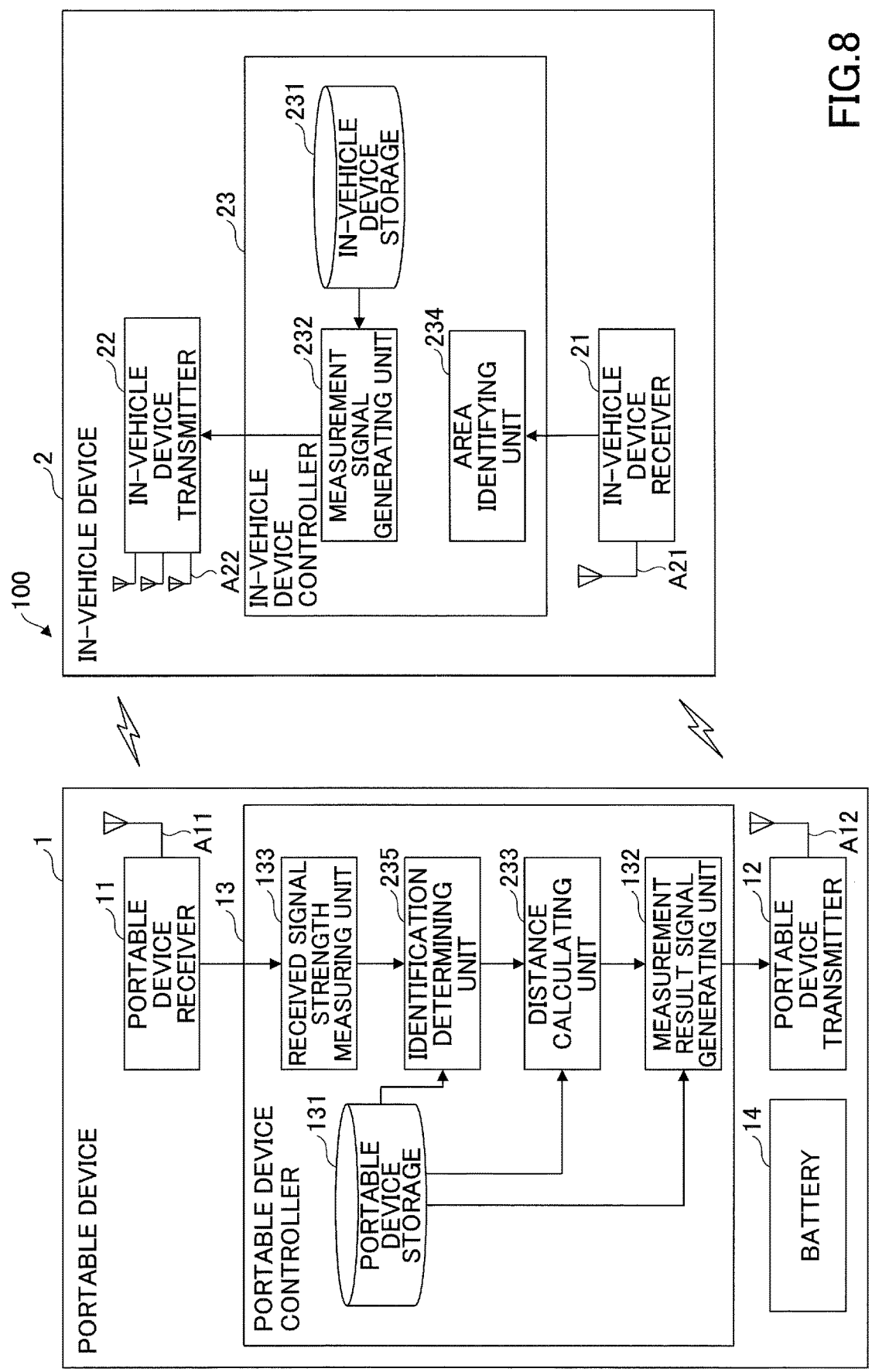
FIG. 8 is a diagram illustrating a second variation of the keyless entry system.

FIG. 8 is a diagram illustrating a second variation of the keyless entry system 100 according to the present embodiment. In the second variation, the distance calculating unit 233 and the identification determining unit 235 are provided in the portable device controller 13. The distance calculating unit 233 and the identification determining unit 235 are implemented by causing the CPU of the portable device controller 13 to execute a program and work with other hardware. In addition, the portable device storage 131 preliminarily stores reference values and coefficients for calculating distances L, and also stores thresholds xth1 to xth3 for determining whether to identify the location of the portable device 1.

In the second variation, received signal strengths x measured by the received signal strength measuring unit 133 are input into the identification determining unit 235, and the identification determining unit 235 determines whether to identify the location of the portable device 1 based on the input received signal strengths x and also the thresholds xth1 to xth3 stored in the portable device storage 131. When the identification determining unit 235 has determined to identify the location of the portable device 1, the received signal strengths x measured by the received signal strength measuring unit 133 are input into the distance calculating unit 233. The distance calculating unit 233 calculates distances L from the portable device 1 to the areas S based on the input received signal strengths x and also the reference values $\mu_i$ and the coefficients $r_{ij}$ stored in the portable device storage 131. The measurement result signal generating unit 132 wirelessly transmits, to the in-vehicle device 2, a measurement result signal A that includes the distances L calculated by the distance calculating unit 233. The area identifying unit 234 identifies an area S to which the portable device 1 belongs, based on the distances L included in the measurement result signal A received by the in-vehicle device receiver 21 from the portable device 1.

Figure 9:
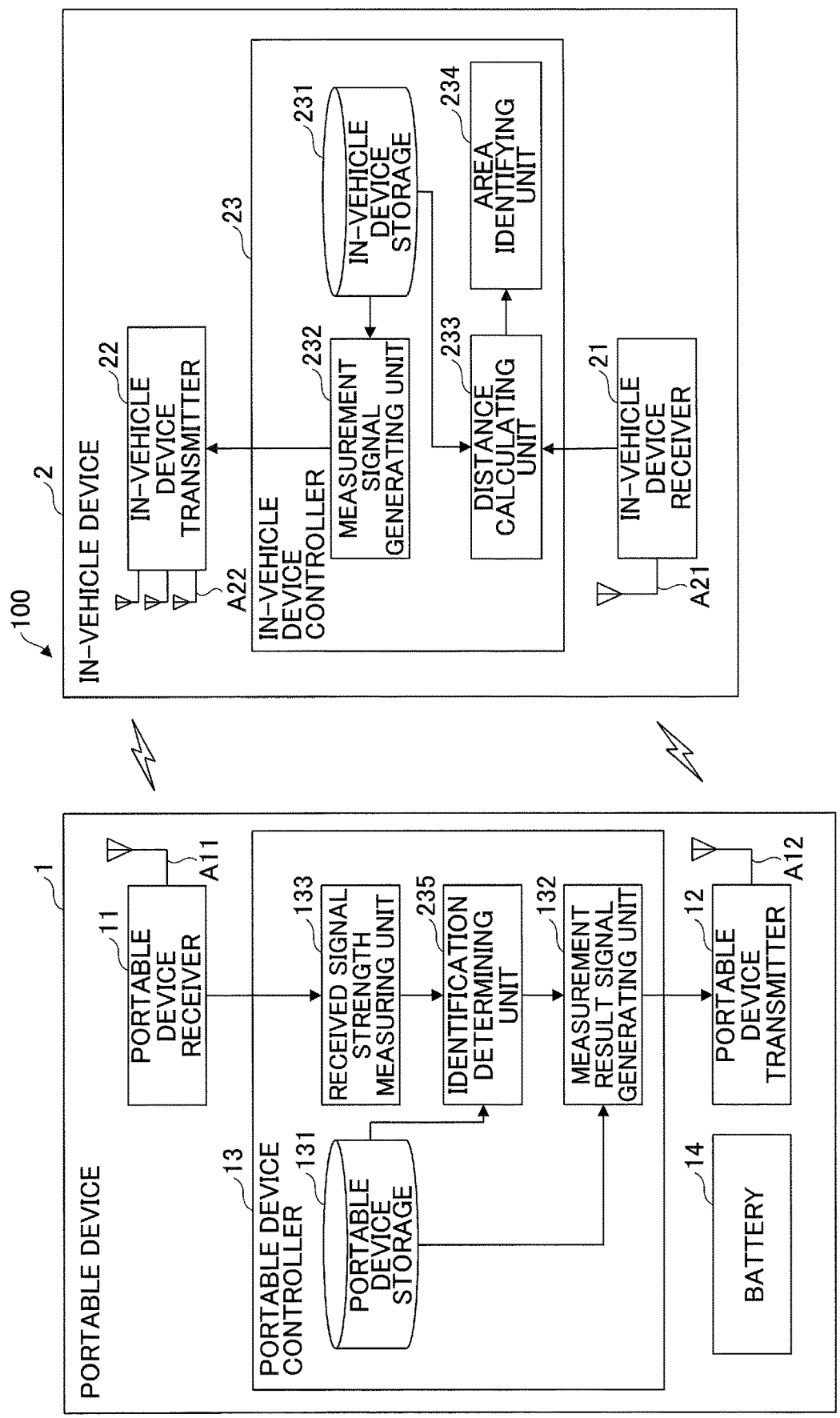
FIG. 9 is a diagram illustrating a third variation of the keyless entry system.

FIG. 9 is a diagram illustrating a third variation of the keyless entry system 100 according to the present embodiment. In the third variation, the identification determining unit 235 is provided in the portable device controller 13. The identification determining unit 235 is implemented by causing the CPU of the portable device controller 13 to execute a program and work with other hardware. Further, the portable device storage 131 preliminarily stores thresholds xth1 to xth3 for determining whether to identify the location of the portable device 1.

In the third variation, received signal strengths x measured by the received signal strength measuring unit 133 are input into the identification determining unit 235, and the identification determining unit 235 determines whether to identify the location of the portable device 1 based on the input received signal strengths x and also the thresholds xth1 to xth3 stored in the portable device storage 131. When the identification determining unit 235 has determined to identify the location of the portable device 1, the measurement result signal generating unit 132 wirelessly transmits, to the in-vehicle device 2, a measurement result signal A that includes the received signal strengths x measured by the received signal strength measuring unit 133. The distance calculating unit 233 calculates distances L from the portable device 1 to the areas S based on the input received signal strengths x and also the reference values $\mu_i$ and the coefficients $r_{id}$ stored in the in-vehicle device storage 231. The area identifying unit 234 identifies an area S to which the portable device 1 belongs, based on the distances L calculated by the distance calculating unit 233.

According to the first to third variations, the portable device 1 determines whether to identify the location of the portable device 1 based on signal strengths x of received measurement signals R that have been transmitted from the respective transmitting antenna A22. Specifically, when it is assumed that the portable device 1 is located away from the in-vehicle device 2, the in-vehicle device determines not to identify the location of the portable device 1. Conversely, when it is assumed that the portable device 1 is not located away from the in-vehicle device 2, the in-vehicle device 2 determines to identify the location of the portable device 1. Accordingly, it is possible to prevent reduction in accuracy of identifying the location of the portable device 1, namely to improve the accuracy of identifying the location of the portable device 1. In other words, it is possible to provide the keyless entry system 100 that can accurately identify the location of the portable device 1 based on signal strengths x of received measurement signals R. Further, according to at least one of the first determination method and the second determination method, it is possible to avoid a situation in which the portable device 1 located outside the vehicle is incorrectly identified as being located inside the vehicle, thereby improving the safety and security of the vehicle.

Figure 10:
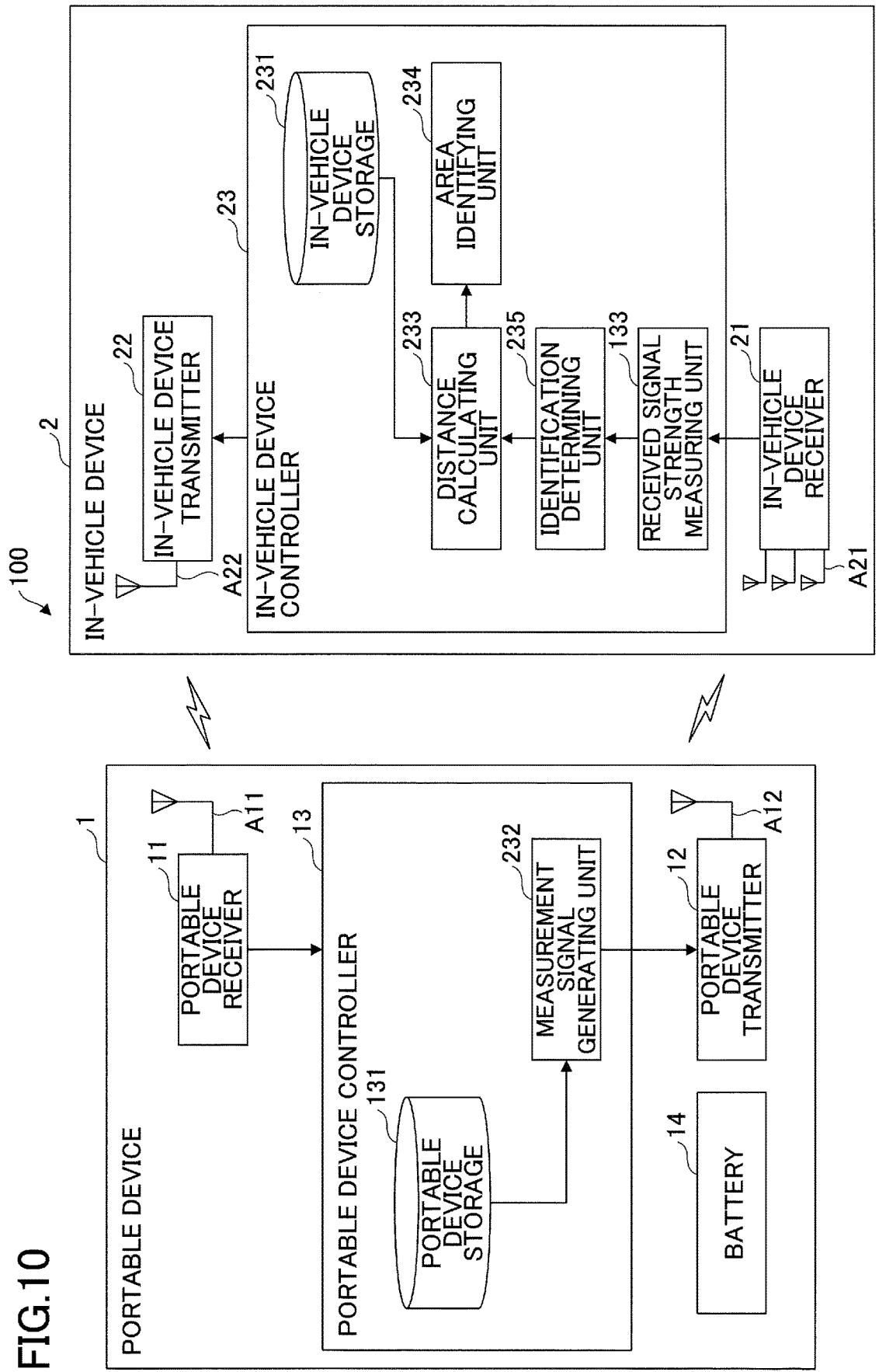
FIG. 10 is a diagram illustrating a fourth variation of the keyless entry system.

FIG. 10 is a diagram illustrating a fourth variation of the keyless entry system 100 according to the present embodiment. In the fourth variation, the received signal strength measuring unit 133 is provided in the in-vehicle device controller 23. The received signal strength measuring unit 133 is implemented by causing the CPU of the in-vehicle device controller 23 to execute a program and work with other hardware. Further, the measurement signal generating unit 232 is provided in the portable device controller 13. The measurement signal generating unit 232 is implemented by causing the CPU of the portable device controller 13 to execute a program and work with other hardware. Further, the in-vehicle device 2 includes a plurality of receiving antennas A21. In the fourth embodiment, one transmitting antenna A22 may be provided.

In the fourth variation, the measurement signal generating unit 232 generates measurement signals R each including a measurement portion. The portable device transmitter 12 wirelessly transmits the measurement signals R to the in-vehicle device 2. The in-vehicle device receiver 21 receives, via the respective receiving antennas A21, the measurement signals R transmitted from the portable device transmitter 12, and inputs the measurement signals R received via the respective receiving antennas A21 into the received signal strength measuring unit 133. The received signal strength measuring unit 133 measures, on a per-receiving-antenna A21 basis, signal strengths x of the received measurement signals R that have been input from the in-vehicle device receiver 21, and inputs the received signal strengths x into the distance calculating unit 233. The identification determining unit 235 determines whether to identify the location of the portable device 1, based on the received signal strengths x, which have been measured on a per-receiving-antenna A21 basis and have been input from the received signal strength measuring unit 133, and also based on reference values $\mu_i$ and coefficients $r_{ij}$ stored in the in-vehicle device storage 231. When the identification determining unit 235 has determined to identify the location of the portable device 1, the distance calculating unit 233 calculates distances L from the portable device 1 to the areas S, based on the received signal strengths x measured by the received signal strength measuring unit 133, and also the reference values $\mu_i$ and the coefficients $r_{ij}$ stored in the in-vehicle device storage 231. The area identifying unit 234 identifies an area S to which the portable device 1 belongs, based on the distances L calculated by the distance calculating unit 233.

According to the fourth variation, the in-vehicle device 2 can determine whether to identify the location of the portable device 1, based on signal strengths x of received measurement signals R, which have been received by the respective receiving antennas A21. Specifically, when it is assumed that the portable device 1 is located away from the in-vehicle device 2, the in-vehicle device 2 determines not to identify the location of the portable device 1. Conversely, when it is assumed that the portable device 1 is not located away from the in-vehicle device 2, the in-vehicle device 2 determines to identify the location of the portable device 1. Accordingly, it is possible to prevent reduction in accuracy of identifying the location of the portable device 1, namely to improve the accuracy of identifying the location of the portable device 1. In other words, it is possible to provide the keyless entry system 100 that can accurately identify the location of the portable device 1 based on signal strengths x of received measurement signals R. Further, according to at least one of the first determination method and the second determination method, it is possible to avoid a situation in which the portable device 1 located outside the vehicle is incorrectly identified as being located inside the vehicle, thereby improving the safety and security of the vehicle.

According to at least one embodiment, it is possible to provide a keyless entry system that accurately identifies the location of a portable device based on signal strengths of received measurement signals.

Further, the present invention is not limited to the configurations described herein, and other elements may be combined with the above-described configurations. Variations and modifications may be made to the described subject matter without departing from the scope of the invention as set forth in the accompanying claims.

What is claimed is:

1. An in-vehicle device comprising:
   a plurality of transmitting antennas;
   an in-vehicle device transmitter configured to transmit measurement signals via the plurality of respective transmitting antennas;
   an in-vehicle device receiver configured to receive, from a portable device, a measurement result signal that includes measurement data of received signal strengths of the respective measurement signals that have been transmitted from the plurality of respective transmitting antennas; and
   an in-vehicle device controller configured to determine whether to identify a location of the portable device based on the received signal strengths included in the measurement result signal, and, in a case where the in-vehicle device controller has determined that the location of the portable device is to be identified, identify the location of the portable device based on the received signal strengths included in the measurement result signal, wherein the in-vehicle device controller determines not to identify the location of the portable device in a case where the measurement result signal lacks at least one received signal strength among the received signal strengths.

2. The in-vehicle device according to claim 1, wherein the in-vehicle device controller determines not to identify the location of the portable device in a case where a given received signal strength of a measurement signal that has been transmitted from a transmitting antenna installed inside a vehicle is below a first threshold, the given received signal strength being from among the received signal strengths.

3. The in-vehicle device according to claim 1, wherein the in-vehicle device controller determines not to identify the location of the portable device in a case where two or more received signal strengths of measurement signals that have been transmitted from respective transmitting antennas are not included in the measurement result signal, the two or more received signal strengths being from among the received signal strengths.

4. The in-vehicle device according to claim 1, wherein the in-vehicle device controller determines not to identify the location of the portable device in a case where the received signal strengths included in the measurement result signal are all below a threshold.

5. The in-vehicle device according to claim 1, wherein the in-vehicle device controller determines not to identify the location of the portable device in a case where a difference between a maximum value and a minimum value of the received signal strengths included in the measurement result signal is below a threshold.

6. The in-vehicle device according to claim 1, wherein, in the case where the in-vehicle device controller has determined that the location of the portable device is to be identified, the in-vehicle device controller calculates a distance from the portable device to each of a plurality of preset areas based on the received signal strengths of the respective measurement signals included in the measurement result signal, and identifies an area to which the portable device belongs from the plurality of preset areas based on the distance.

7. The in-vehicle device according to claim 6, wherein the distance is a Mahalanobis distance or an Euclidean distance.

8. The in-vehicle device according to claim 1, wherein the in-vehicle device transmitter includes one in-vehicle device transmitter connected to the plurality of transmitting antennas.

9. The in-vehicle device according to claim 1, wherein the in-vehicle device transmitter includes a plurality of in-vehicle device transmitters each connected to a corresponding transmitting antenna of the plurality of transmitting antennas.

10. An in-vehicle device comprising:
    a plurality of transmitting antennas;
    an in-vehicle device transmitter configured to transmit measurement signals via the plurality of respective transmitting antennas;
    an in-vehicle device receiver configured to receive, from a portable device, a measurement result signal that includes measurement data of received signal strengths of the respective measurement signals that have been transmitted from the plurality of respective transmitting antennas; and
    an in-vehicle device controller configured to determine whether to identify a location of the portable device based on the received signal strengths included in the measurement result signal, and, in a case where the in-vehicle device controller has determined that the location of the portable device is to be identified, identify the location of the portable device based on the received signal strengths included in the measurement result signal, wherein the in-vehicle device controller determines not to identify the location of the portable device in a case where a given received signal strength of a measurement signal that has been transmitted from a transmitting antenna installed inside a vehicle is below a first threshold, the given received signal strength being from among the received signal strengths.

11. The in-vehicle device according to claim 10, wherein the in-vehicle device controller determines not to identify the location of the portable device in a case where two or more received signal strengths of measurement signals that have been transmitted from respective transmitting antennas are not included in the measurement result signal, the two or more received signal strengths being from among the received signal strengths.

12. The in-vehicle device according to claim 10, wherein the in-vehicle device controller determines not to identify the location of the portable device in a case where the received signal strengths included in the measurement result signal are all below a second threshold.

13. The in-vehicle device according to claim 12, wherein the in-vehicle device controller determines not to identify the location of the portable device in a case where a difference between a maximum value and a minimum value of the received signal strengths included in the measurement result signal is below a third threshold.

14. The in-vehicle device according to claim 12, wherein the distance is a Mahalanobis distance or an Euclidean distance.

15. The in-vehicle device according to claim 10, wherein, in the case where the in-vehicle device controller has determined that the location of the portable device is to be identified, the in-vehicle device controller calculates a distance from the portable device to each of a plurality of preset areas based on the received signal strengths of the respective measurement signals included in the measurement result signal, and identifies an area to which the portable device belongs from the plurality of preset areas based on the distance.

16. The in-vehicle device according to claim 10, wherein the in-vehicle device transmitter includes one in-vehicle device transmitter connected to the plurality of transmitting antennas.

17. The in-vehicle device according to claim 10, wherein the in-vehicle device transmitter includes a plurality of in-vehicle device transmitters each connected to a corresponding transmitting antenna of the plurality of transmitting antennas.

18. An in-vehicle device comprising:
a plurality of transmitting antennas;
an in-vehicle device transmitter configured to transmit measurement signals via the plurality of respective transmitting antennas;
an in-vehicle device receiver configured to receive, from a portable device, a measurement result signal that includes measurement data of received signal strengths of the respective measurement signals that have been transmitted from the plurality of respective transmitting antennas; and
an in-vehicle device controller configured to determine whether to identify a location of the portable device based on the received signal strengths included in the measurement result signal, and, in a case where the in-vehicle device controller has determined that the location of the portable device is to be identified, identify the location of the portable device based on the received signal strengths included in the measurement result signal, wherein the in-vehicle device controller determines not to identify the location of the portable device in a case where a difference between a maximum value and a minimum value of the received signal strengths included in the measurement result signal is below a threshold.

19. The in-vehicle device according to claim 18, wherein the in-vehicle device controller determines not to identify the location of the portable device in a case where two or more received signal strengths of measurement signals that have been transmitted from respective transmitting antennas are not included in the measurement result signal, the two or more received signal strengths being from among the received signal strengths.

20. The in-vehicle device according to claim 18, wherein the in-vehicle device controller determines not to identify the location of the portable device in a case where the received signal strengths included in the measurement result signal are all below a threshold.

21. The in-vehicle device according to claim 20, wherein the distance is a Mahalanobis distance or an Euclidean distance.

22. The in-vehicle device according to claim 18, wherein, in the case where the in-vehicle device controller has determined that the location of the portable device is to be identified, the in-vehicle device controller calculates a distance from the portable device to each of a plurality of preset areas based on the received signal strengths of the respective measurement signals included in the measurement result signal, and identifies an area to which the portable device belongs from the plurality of preset areas based on the distance.

23. The in-vehicle device according to 18, wherein the in-vehicle, device transmitter includes one in-vehicle device transmitter connected to the plurality of transmitting antennas.

24. The in-vehicle device according to claim 18, wherein the in-vehicle device transmitter includes a plurality of in-vehicle device transmitters each, connected to a corresponding transmitting antenna of the plurality of transmitting antennas.

* * * * *